Feb. 12, 1963 L. HAMMOND 3,077,136
CAPACITY TUNED OSCILLATOR
Filed Feb. 26, 1959
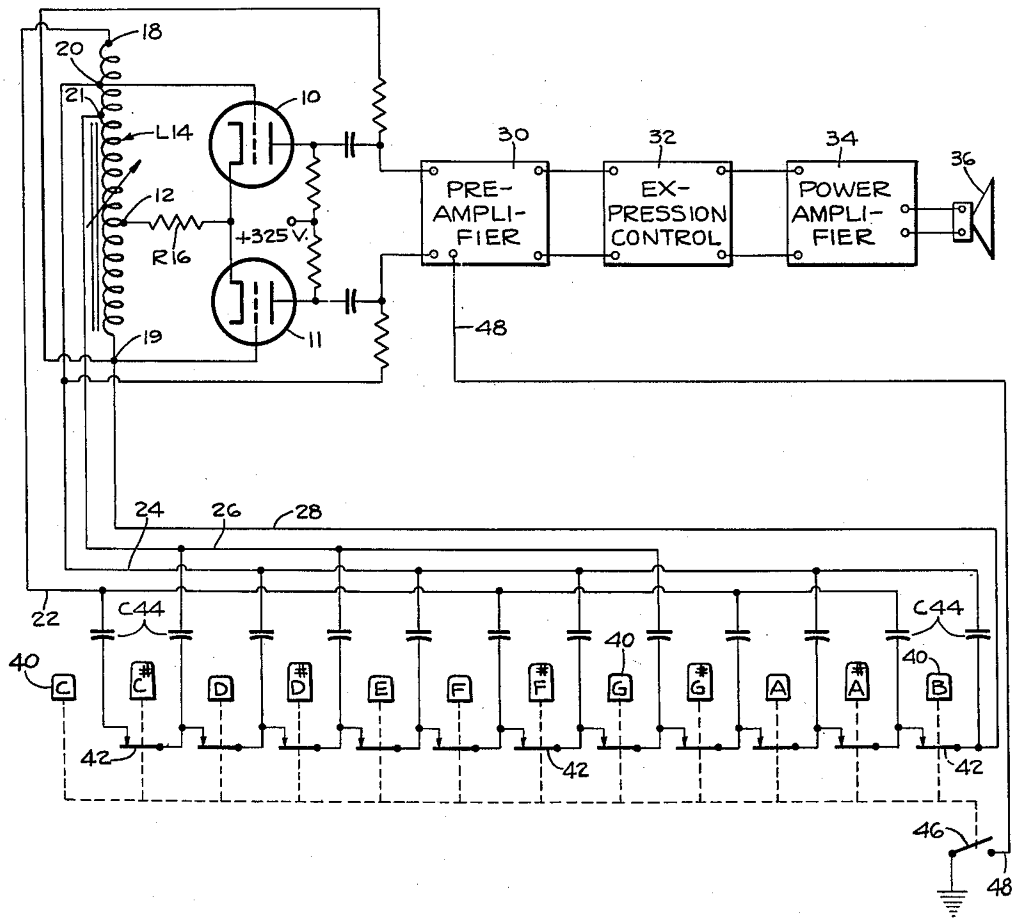
Inventor
Laurens Hammond
By Benjamin F. Wupper
Atty.

Patented Feb. 12, 1963

3,077,136

CAPACITY TUNED OSCILLATOR

Laurens Hammond, Chicago, Ill., assignor to Hammond Organ Company, Chicago, Ill., a corporation of Delaware Filed Feb. 26, 1959, Ser. No. 795,665
2 Claims. (Cl. 84—1.01)

The invention relates generally to electrical musical instruments of the solo or melody type and more particularly to the main oscillator and its resonant circuit tuning means used in such instruments.

In the manufacture of oscillators of the type shown herein, a large number of capacitors are required and it is therefore highly desirable that their values, as purchased, not be critical. Capacitors are supplied by the manufacturers at the lowest price if the customer will accept a tolerance of ±20% in capacitance value, a slightly increased price if a tolerance of ±15% is permitted, and the price of the capacitors increases rapidly as the tolerance permitted is less and less. It is thus economical for a manufacturer using large quantities of capacitors to purchase those with the higher permitted tolerances. However, in the tuning of an electron discharge oscillator forming part of an electrical musical instrument the values of the capacitors used must be very accurate so as to make it possible to tune the oscillator with exactness to the semitone intervals of the tempered musical scale.

It is therefore the primary object of the invention to provide the means and a method for making a tuning circuit for an oscillator which may be tuned with sufficient accuracy to the frequencies of the notes of the scale without requiring the use of capacitors of the exact value which would otherwise be required.

The drawing illustrates the invention by a block and schematic circuit diagram.

The oscillator herein illustrated comprises a pair of triodes 10 and 11, the cathodes of which are connected to a center tap 12 of a variable inductance element L14, the connection being made through a resistor R16. This inductance element has end terminals 18 and 19 and a plurality of taps 20 and 21. The number of turns between taps 18 and 20 is approximately 4% of the total number of turns, and the number of turns between taps 20 and 21 are also approximately 4% of the total number of turns of the inductance element L14.

The control grid of triode 10 is connected to tap 20 while the control grid of triode 11 is connected to tap 19. The end terminal 18 has a conductor 22 connected thereto. The tap 20 has a conductor 24 connected thereto, while the tap 21 and end terminal 19 have conductors 26 and 28 connected thereto respectively.

The push pull oscillator shown is merely representative of any suitable type of electronic oscillator requiring an inductance-capacitance tuning circuit. The output of the oscillator is supplied to a preamplifier 30 which, in turn, is coupled to an expression control device 32, power amplifier 34, and speaker 36 in a conventional manner.

The pitch at which the oscillator operates is determined by selective depression of playing pedals or keys 40, herein representing the notes C to B of a one octave range. Key-operated switches 42 for all the keys (except the C key) are connected in series, at one end, to conductor 28 and thus to the end terminal 19 of inductance L14. The other end of the series of switches 42 is connected, through a capactior C44 for the key C# and conductor 22, to the end terminal 18. A capacitor C44 is associated with each switch except for the C key, such switch not being required for the latter key because when all of the switches 42 are closed the oscillator will be tuned to the pitch of the note C.

In addition to opening one of the switches 42 each of the keys thereafter closes a switch 46 to connect conductor 48 to ground. The switch 46 is operable upon the depression of any of the keys preferably through a bail mechanism such as disclosed in Laurens Hammond et al. Patent No. 2,626,325. The switch 46 controls the gain of the preamplifier 30 in any of several well-known ways.

The manufacture of the oscillator tuning circuit is greatly facilitated by virtue of the fact that capacitors C44 may be of desired nominal values with a tolerance of as much as ±20%, without the necessity of measuring their exact values.

The following method is employed. First a capacitor C44 is taken from a lot of capacitors of the desired nominal value and connected between conductors 24 and 28, thus effectively between end terminal 19 and tap 20. The inductance L14 is then varied until the oscillator operates at a pitch corresponding to that of the highest note of the scale, preferably using a numerical register type frequency meter for this purpose. Then the capacitor C44, for the next to the highest pitch tone, is taken from a lot of the required nominal value, and one terminal is connected to the fixed pole of the switch 42 associated with highest key, herein shown as "B." Then the other terminal of the capacitor is brought into tentative contact with conductors 22, 24, and 26 while observing the frequency meter, and then soldered to the conductor 22, 24, or 26, which results in causing the oscillator to operate at a frequency substantially that of the pitch of the second highest note, A# in the instrument shown.

This method is repeated in making the connections of the capacitors C44 for successively lower notes between the switches 42 and that one of the conductors 22, 24, or 26 which results in causing the oscillator to operate at the pitches of the successively lower keys.

By this method of assembling the resonant circuit for the oscillator the workman need not known the exact value of the capacitor employed nor is it necessary that the exact capacitance of the capacitors should be measured. By using a frequency meter of the type in which the frequency is numerically displayed the assembly of a complete resonant tuning circuit for all of the notes may be accomplished very rapidly, further reducing the cost of the assembly.

It will be noted that the key 40, for the note C, while it does not operate a switch 42, is connected to operate the common switch 46. It will be noted that the depression of any key renders all keys lower in the musical scale ineffective, and thus when two or more keys are depressed at the same time the oscillator will be tuned to the pitch of the highest depressed key. The switches 42 are preferably of the type shown on the aforesaid patent and are latched in open position and so arranged that when a second key is depressed the switches of all other keys are released, that is, closed.

Thus, in playing the instrument the musician may depress one key causing the tone of the corresponding pitch to be sounded and then may depress another key more or less at his leisure without causing a haitus in the music. This is of particular advantage when the keys are pedals as used for controlling the bass tones of an organ.

By virtue of the fact that the capacitors which are used in the tuning circuit are connected in parallel and employed cumulatively, the values of the capacitors, particularly and progressively for the lower notes, are lower than would be required if they were not thus connected.

While I have shown and described a particular embodiment of my invention, it will be apparent to those skilled in the art that numerous modifications and variations may be made in the form and construction thereof, without departing from the more fundamental principles of the invention. I therefore desire, by the following claims, to include within the scope of my invention all such similar and modified forms of the apparatus disclosed, by which substantially the results of the invention may be obtained by substantially the same or equivalent means.

I claim.

1. For use in an electronic musical instrument, an electronic oscillator having a parallel resonant tuning circuit including a variable inductance element, said element having a pair of terminals and a plurality of taps adjacent one of the terminals; a first capacitor connected between the other terminal and one of the taps of the inductance element; a plurality of normally closed key operated switches connected in series between said terminals of the inductance element; a plurality of additional capacitors of correct nominal value but possibly differing from the nominal value through a relatively wide permitted tolerance range; means including one or more of said switches connecting one plate of each of the additional capacitors to said other terminal of the inductance element; and means respectively connecting the other plates of said additional capacitors to that one of the taps of the inductance element which will cause the oscillator to operate at freqeuncies substantially corresponding to the semitone intervals of the musical scale depending upon the number of such additional capacitors which are retained effectively in the resonant tuning circuit upon opening one of the key operated switches.

2. The combination set forth in claim 1 in which the taps and the one terminal of the inductance element are spaced at intervals of less than ten percent of the total number of turns.

References Cited in the file of this patent

UNITED STATES PATENTS

| | | |
|---|---|---|
| 2,806,953 | Krause | Sept. 17, 1957 |
| 2,806,954 | Tennis | Sept. 17, 1957 |
| 2,818,760 | Spencer | Jan. 7, 1958 |
| 2,873,637 | Herold | Feb. 17, 1959 |
| 2,924,776 | Peterson | Feb. 9, 1960 |